(12) United States Patent
Hong

(10) Patent No.: US 6,298,241 B1
(45) Date of Patent: Oct. 2, 2001

(54) METHOD OF PERFORMING POWER CONTROL IN MOBILE COMMUNICATION SYSTEM

(75) Inventor: Sung Hyuck Hong, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/195,561

(22) Filed: Nov. 19, 1998

(30) Foreign Application Priority Data

Feb. 10, 1998 (KR) .................................................. 98/3825

(51) Int. Cl.[7] ........................................................ H04Q 7/20
(52) U.S. Cl. ........................ 455/522; 455/232.1; 455/13.4
(58) Field of Search .................................. 455/68, 69, 70, 455/522, 123, 125, 574, 136, 139, 232.1, 234.1, 234.2, 63, 38.3, 13.4; 370/227, 228, 328, 335, 342, 479; 375/219, 222, 316, 265, 200, 206, 227, 317

(56) References Cited

U.S. PATENT DOCUMENTS 5,541,955 * 7/1996 Jacobsmeyer ........................ 375/222
5,673,260 * 9/1997 Umeda et al. ...................... 455/436

* cited by examiner

Primary Examiner—Nay Maung
Assistant Examiner—Jean A Gelin
(74) Attorney, Agent, or Firm—Fleshner & Kim, LLP

(57) ABSTRACT

Provided with a method of performing power control in a CDMA mobile communication system, characterized by including the steps of: repeatedly updating information concerning the change of a channel state between a mobile station and a base station at regular intervals; varying a channel gain up/down time and/or a channel gain up/down delta adaptively based on the updated information; and adjusting the channel gain between the mobile station and the base station.

40 Claims, 7 Drawing Sheets

METHOD OF PERFORMING POWER CONTROL IN MOBILE COMMUNICATION SYSTEM

BACKGROUND OF THE INVENTION

1. Field of the Invention

The present invention generally relates to a method of performing power control in a mobile communication system using the code division multiple access (CDMA) scheme. More particularly, it relates to a method of performing power control which is designed to adaptively control transmission power supplied from a base station to a mobile station (terminal station).

2. Description of the Related Art

It is of much importance to maximize the capacity for concurrent communications with multiple mobile stations in a frequency band supplied to a CDMA mobile communication system. A method of maximizing the capacity of a given system involves performing power control of the mobile communication system. Such methods are classified into two parts: a forward link power control for transmission power received by the terminal station from the base station, and a reverse link power control for transmission power received by the base station from the terminal station.

During the forward link power control, the mobile station located at the edge of a cell has to consume much power enough to maintain service quality to the same level as the mobile station located at a position near the base station, which is called "coner problem". Especially, the power assigned to the mobile station affects the other mobile stations as a noise in the CDMA system. Thus signal-to-noise ratio (SNR) for all mobile stations has to be kept constant by assigning less power to those mobile stations that actually need relatively small power consumption, while assigning the rest of the power to those mobile stations that require much power, in order to maximize capacity of the system.

On the contrary, the intensity of a signal received by the base station from a mobile station near the base station is stronger than that of a signal received by the base station from a mobile station located at a position far from the base station. This refers to as "near-end far-end problem". Without a proper control of transmission power, the signal output from a mobile station near the base station is received by the base station with higher intensity than is needed. The surplus power affects the signals received from the other mobile stations as a noise especially in the CDMA mobile communication system.

The forward link power control employed in the conventional CDMA mobile communication system is performed with channel elements (CEs) included in each of the mobile stations and base station (BS), and a selector provided in the base station controller (BSC). Such a conventional power control is adopted to the CDMA exchanger (product name: STAREX CMX) used in the SK Telecom.

Next, a method of performing forward control in the CDMA mobile communication system is described.

Each mobile station transmits error rate information for a forward frame applied to it. To transmit the error rate information, rate set 1 defined in the J-STD-008, PCS standard protocol with processing rate of 9.6, 4.8, 2.4 or 1.2 kbps uses a power measurement report message, while rate set 2 having processing rate of 14.4, 7.2, 3.6 or 1.8 kbps uses a one-bit error indicator bit assigned to every frames predetermined such as 20 msec or a power measurement report message. The selector increases or decreases the traffic channel gain based on the received forward frame error rate, sending the result to the channel element of the base station. Then the channel element controls the magnitude of transmission power to be supplied to the mobile station based on the traffic channel gain.

As described above, channel gain is controlled at the selector, which checks upon the forward frame error rate (FER) reported from the mobile station. If the forward FER exceeds a predetermined threshold and the current power is too weak, the selector increases the channel gain, which refers to as "upward adjustment". If the forward FER is below the predetermined threshold and the current power is strong enough, the selector decreases the channel gain, which is called "downward adjustment".

Below is a description of the upward and downward adjustments with regards to the forward link power control in a CDMA mobile communication system.

The down adjustment of the forward link power control is performed when the number of forward error frames is lower than a threshold for a given period of time. It means, the selector provided in the base station controller sets a channel gain down timer to a predetermined gain down time 101 or 301, as shown in FIGS. 1 or 3. If the forward frame error is below the threshold until the timer is terminated, the selector decrements the channel gain by a constant gain down delta 102 or 302, initializing the timer to the gain down time again. If the forward FER exceeds before the timer is terminated and the gain up adjustment is achieved, the selector initializes the timer to the gain down time again.

On the other hand, The upward adjustment of the forward link power control is performed when the number of forward error frames received from the mobile station exceeds a predetermined threshold. However, the delta of the channel gain to be adjusted upward is dependent upon the FER. That means, as shown in FIGS. 1 and 3, the gain up delta is classified into small up deltas 103 and 303, and big up deltas 104 and 304 larger than the small up deltas by a predetermined value. If the FER is below a predetermined threshold, the channel gain is increased by the small up deltas 103 and 303. If the FER exceeds the predetermined threshold, the channel gain is increased by the big up delta 104 or 304.

The conventional channel gain downward adjusting method may prevent little problems in an environment where there are little variations in the channel status because the gain down time and the gain down delta are constant. However, it is problematic in an environment where the channel status has large variations such as in the case the mobile station passes through a shadowing area, as illustrated in FIG. 1. It is thus understood that the conventional method hardly satisfy both channel statuses shown in FIGS. 1 and 3. When the channel status becomes better than in FIG. 1, or when the gain down time is set shorter than the time shown in FIG. 1 in order to reduce downward tracking time 111, a gain increase interval 311 of the gain up time in FIG. 3 becomes shorter only to increase the FER at the same power consumption.

Contrarily, in a case where the gain down time is set very long enough to be suitable for the channel status shown in FIG. 3, the downward tracking time 111 in the channel status of FIG. 1 gets prolonged to cause unnecessary power consumption, which affects as a noise the mobile stations in the cell which is adjacent to the other mobile stations therein. This causes the channel capacity of the entire communication system to be reduced. The channel environments as shown in FIGS. 1 and 3 occur very often in reality and attention must be taken to both of them in order to achieve efficient power control.

Additionally, the conventional method involves another problem that the adjustment conditions cannot be applied precisely during an upward adjustment of the channel gain. That means, the conditions of the channel gain upward adjustment are determined depending upon the result of a judgement as to whether or not the FER calculated from the number of error frames occurring in the predetermined number of frames exceeds a threshold. If the FER exceeds the threshold, the channel gain is increased by the current big up delta. If the FER is below the threshold, the channel gain is decreased by the current small up delta. However, it often happens that the channel gain increases by a big up delta even when it can be increased by a small up delta, in which case unnecessary power consumption is caused to adversely affect another mobile stations in the cell and the mobile stations in another cell. This may appear very often especially when frame errors occur continuouslly.

SUMMARY OF THE INVENTION

Accordingly, the present invention is contrived to settle down the aforementioned problems with the prior art and the object of the present invention is to provide a method of performing power control in a CDMA mobile communication system, by which channel gain can be automatically adjusted to provide gain down time or gain down delta to be suitable to each channel status in case of a downward adjustment, or the conditions for an upward adjustment can be precisely executed.

To achieve the above-described object, the present invention is adapted to update information concerning the change of channel state between a certain mobile station and a base station at regular intervals and vary a gain up/down time and/or a gain up/down delta based on the updated information, performing upward/downward adjustment of the channel gain of the mobile station and the base station.

Preferably, the downward adjustment of channel gain is achieved in such a way that if the channel state has become better suddenly, the gain down time is reduced continuously, or if the channel state is optimal, the gain down time is increased continuously.

The upward adjustment of channel gain includes the steps of: increasing the channel gain by a predetermined small delta if continuous and discontinuous error frames appear while the previous channel state is good; increasing the channel gain by a predetermined large delta if continuous error frames appear while the previous channel state is not good; and increasing the channel gain by a predetermined small delta if discontinuous error frames appear irrespective of the previous channel state.

Such characterized present invention further uses a field to memorize the previous channel state to vary the gain up delta in the upward adjustment of channel gain in consideration of the current channel state, thereby enhancing the FER performance with respect to power consumption and preventing unnecessary power consumption.

Furthermore, the downward adjustment of channel gain is performed in such a way that the downward cycle is variable in multi-steps within a predetermined range to provide the optimal downward cycle based on the channel state, making it possible to track the change of forward channel power required by the mobile station, with the consequence of a reduction of unnecessary power consumption and enhancement of FER performance with respect to power consumption.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Hereafter, the operation of a preferred embodiment of the present invention will be described in reference to the accompanying drawings.

First, each mobile station transmits error rate information concerning the received forward frames to a selector. For this, a rate set 1 defined in the standard protocol for PCS with processing rates of 9.6, 4.8, 2.4 and 1.2 kbps, J-STD-008 uses a power measurement report message, while a rate set 2 defined in the standard protocol for PCS with processing rates of 14.4, 7.2, 3.6 and 1.8 kbps using a one-bit erasure indicator bit allotted to every predetermined frames such as 20 msec, or a power measurement report message. Upon receiving the forward frame error rate information, the selector increases or decreases the traffic channel gain based on the error rate and transmits the result to the channel element of a base station. Then the channel element controls the magnitude of the transmission power to be supplied to the mobile station based on the received traffic channel gain.

In this manner, the channel gain adjustment performed at the selector is divided into two parts: an upward adjustment for increasing the channel gain when the forward frame error rate (FER) reported from the mobile station exceeds a predetermined threshold, and a downward adjustment for decreasing the channel gain when the forward FER is below the predetermined threshold.

Figure 2:
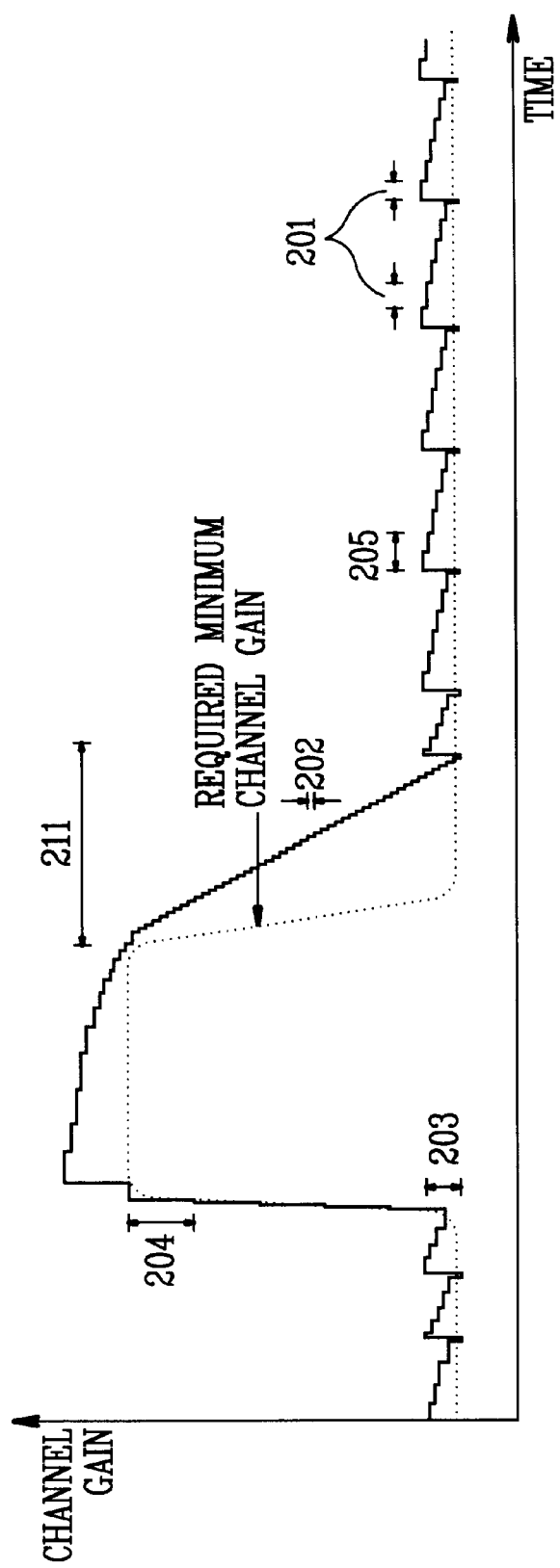
FIG. 2 is a graph showing the result of a forward link power control according to the present invention in a case where a mobile station passes through the shadow area.

Next, a process for performing a forward link power downward adjustment is described in connection with FIGS. 2, 4 and 5.

In a state that a call between the mobile station and the base station has been established, a selector provided in a base station controller sets a gain down timer used to decrease the transmission gain of a given forward channel, initializing it to the initial gain down time 201 or 401, in step S501. The gain down time 201 or 401 is not fixed as in the prior art but variable as shown in FIGS. 2 and 4. A judgement is formed as to whether or not the timer is terminated, in step S502. If the timer is terminated, the channel gain TC_GAIN is decreased by a predetermined gain down delta 202 or 402.

Subsequently, the flow of the processing goes on to step S504 at which a judgement is formed as to whether the channel gain is smaller than the minimum channel gain. If the channel gain is smaller than the minimum channel gain, the channel gain is set to the minimum channel gain, in step S505.

Then the flow of the processing continues to step S506 at which a judgement is formed as to whether the current power control state FPC_STATE is a power control good state or a power control erase state. If the output of the judgement formed in step S506 indicates that the current power control state is the power control erase state FPC_STATE_ERASE, the gain down time is increased by a predetermined time up delta 406 or 507. Subsequently, the flow of the processing goes on to step S508 at which a judgement is formed as to whether or not the gain down time is larger than the maximum gain down time. If larger than the maximum gain down time, the gain down time is set to the maximum gain down time, in step S509.

Contrarily, if the output of the judgement formed in step S506 indicates that the current power control state is the power control good state FPC_STATE_GOOD, the gain down time is decreased by a time down delta 407, in step S510. Subsequently, the flow of the processing goes on to step S511 at which a judgement is formed as to whether or not the gain down time is smaller than the minimum gain down time. If smaller than the minimum gain down time, the gain down time is set to the minimum gain down time, in step S512.

The flow of the processing goes to step S501 at which the gain down timer is initialized to the times determined in steps S509 and S512.

Figure 6A:
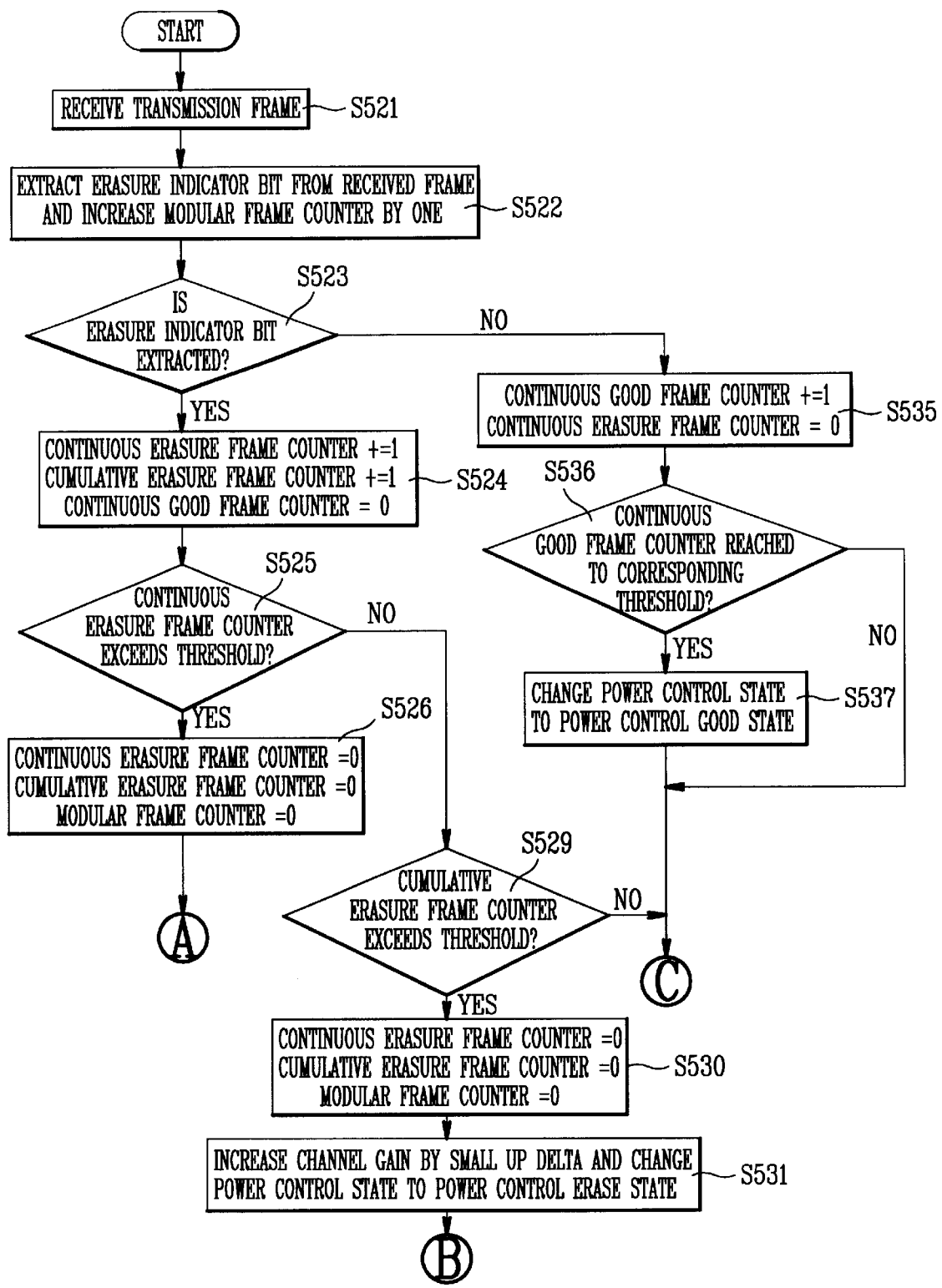
FIG. 6 is a flow chart showing a channel gain upward adjustment in performing the forward link power control according to the embodiment of the present invention.
Figure 6B:
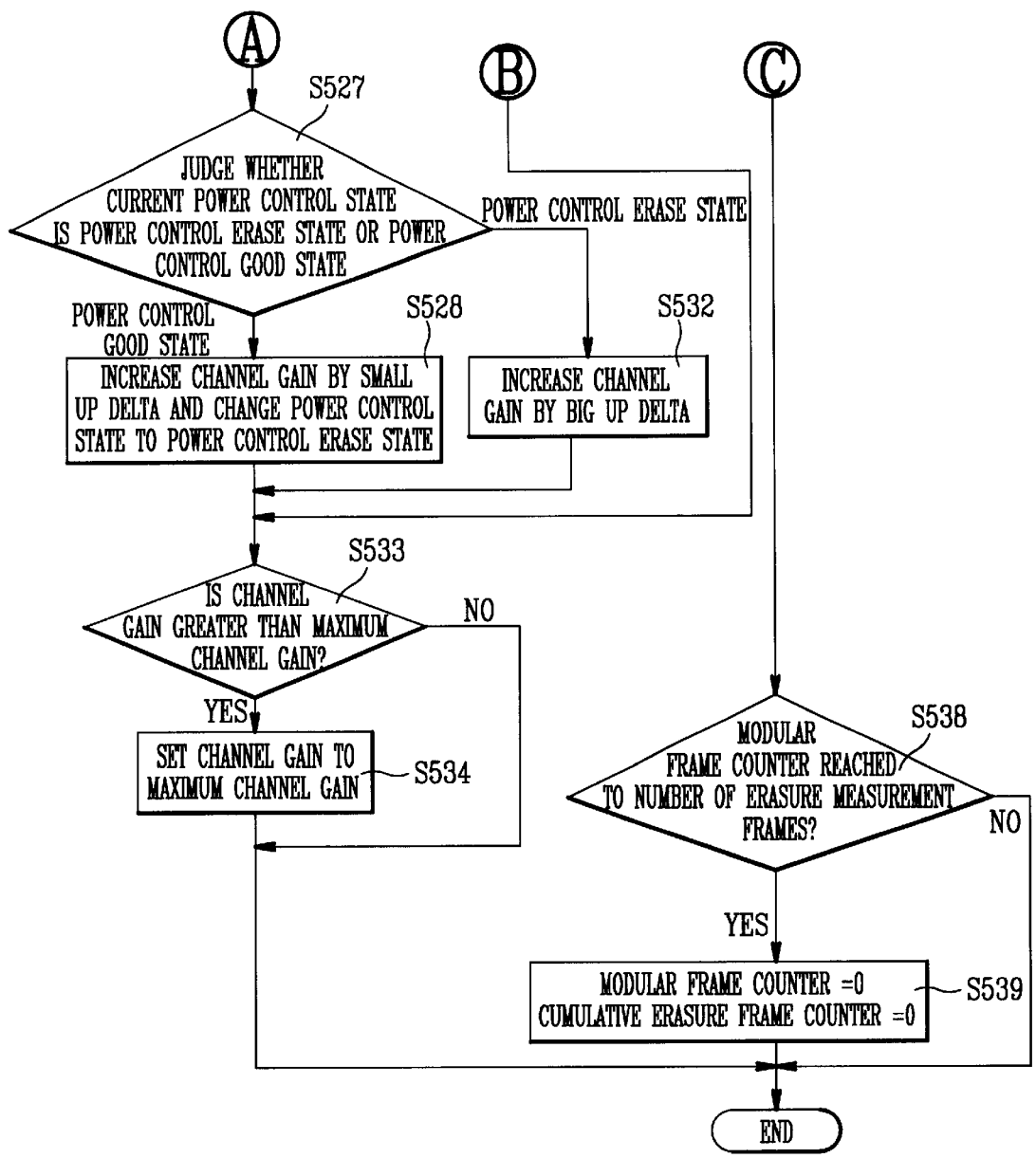

Next, a process for performing a forward link power upward adjustment by processing forward link frame error information is described in connection with FIGS. 2, 4 and 6.

The base station receives frames transferred from the mobile station by a predetermined cycle such as 20 msec, extracting an "erasure indicator bit" from the received frames and increasing "modular frame counter FRAME_COUNTER" for processing discontinuous erasure frames by one, in step S522. The flow of the processing goes on to step S523 at which a judgement is formed as to whether or not the erasure indicator bit is extracted, that is, it is set to "1" out of "0" and "1".

Figure 4:
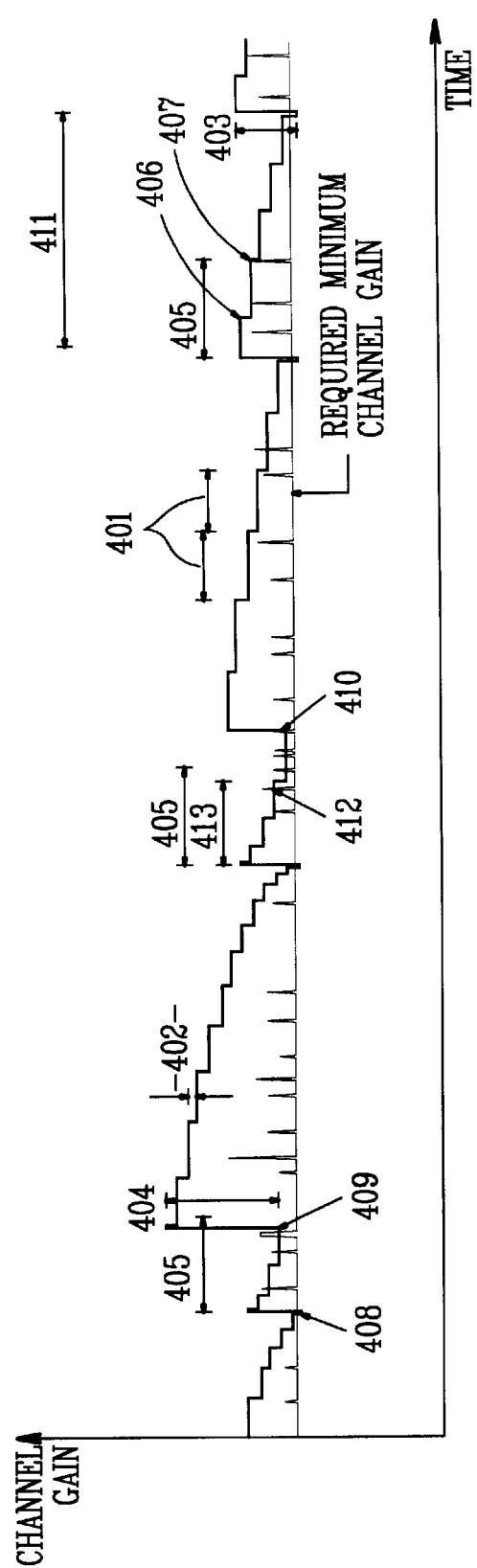
FIG. 4 is a graph showing the result of a forward link power control according to the present invention in a case where a mobile station is located at a position where there is little variations in the propagation environment.
Figure 5:
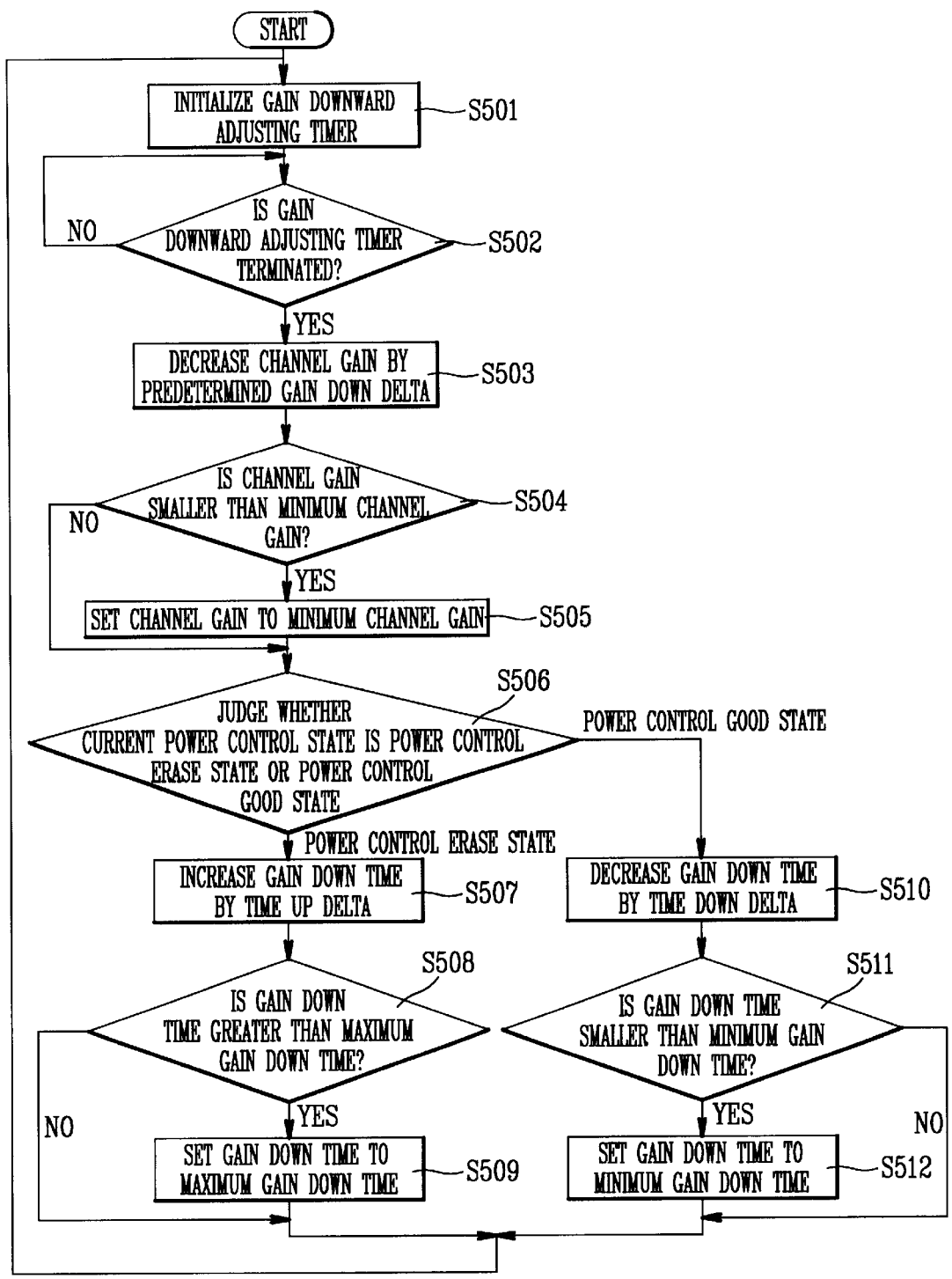
FIG. 5 is a flow chart showing a channel gain downward adjustment in performing the forward link power control according to the embodiment of the present invention.

If the output of the judgement formed in step S523 indicates that the erasure indicator bit is "1", a continuous erasure frame counter CONTINUOUS_ERASURE and a cumulative erasure frame counter CUMULATIVE_ERASURE are incremented by one, and a continuous good frame counter CONTINUOUS _GOOD is reset as in step S412 of FIG. 4 to initialize a transition of the power control state FPC_STATE again, in step S524. Then the flow of the processing continues to step S525 at which a judgement is formed as to whether or not the continuous erasure frame counter exceeds a corresponding threshold THRESHOLD_FOR_CONT.

If the output of the judgement formed in step S525 indicates that the continuous erasure frame counter exceeds the threshold, there are reset the continuous erasure frame counter, the cumulative erasure frame counter and the modular, in step S526. The flow of the processing goes on to step S527 at which a judgement is formed as to whether the current power control state is a power control good state or a power control erase state. If the current power control state is the power control good state, the channel gain is incremented by a small up delta 203 or 403 and the power control state is converted to the power control erase state, in steps S408 and S528. If the current power control state is the power control erase state, the channel gain is increased by a big up delta as shown in FIGS. 2 and 4, in steps S409 and S532. The flow of the processing continues to step S533 at which a judgement is formed as to whether or not the channel gain is larger than the maximum channel gain. If the channel gain is greater than the maximum channel gain, it is set to the maximum channel gain, in step S534.

Alternatively, if the output of the judgement formed in step S525 indicates that the continuous erasure frame counter does not exceed the threshold, it is judged whether or not the cumulative erasure frame counter exceeds a corresponding threshold THRESHOLD_FOR_CUMUL, in step S529. If the cumulative erasure frame counter exceeds the threshold, there are reset the continuous erasure frame counter, the cumulative erasure frame counter and the modular, in step S530. After increasing the channel gain by a small up delta, the power control state is changed to the power control erase state, in steps S410 and S531.

If the output of the judgement formed in step S523 indicates that the erasure indicator bit is "0", the erasure frame counter is reset and the continuous good frame counter is increased by one, in step S523. The flow of the processing then continues to step S536 at which a judgement is formed as to whether or not the continuous good frame counter has reached to the corresponding thresholds STATE_CHANGE_THRESHOLD 205 and 405.

If the continuous good frame counter has reached to the thresholds, the power control state is changed to the power control good state, in step S537. Subsequent to steps S534 to S529, the flow of the processing goes on to step S538 at which a judgement is formed as to whether or not the modular frame counter has reached to the erasure measurement frames ERASURE_MEASURE_FRAMES 413. If the modular frame counter has reached to the erasure measurement frames ERASURE_MEASURE_FRAMES, the modular frame counter and the cumulative erasure frame counter are reset to initialize a process for discontinuous frame error again, in step S539.

The method of performing power control according to the first preferred embodiment of the present invention as described above is an exemplary one applied to the rate set 2 defined in J-STD-008, PCS standard protocol, and it may be applicable to the rate set 1 defined in J-STD-008 as well as to the outer loop power control of a reverselink that sends transmission signals from mobile station to base station.

Figure 1:
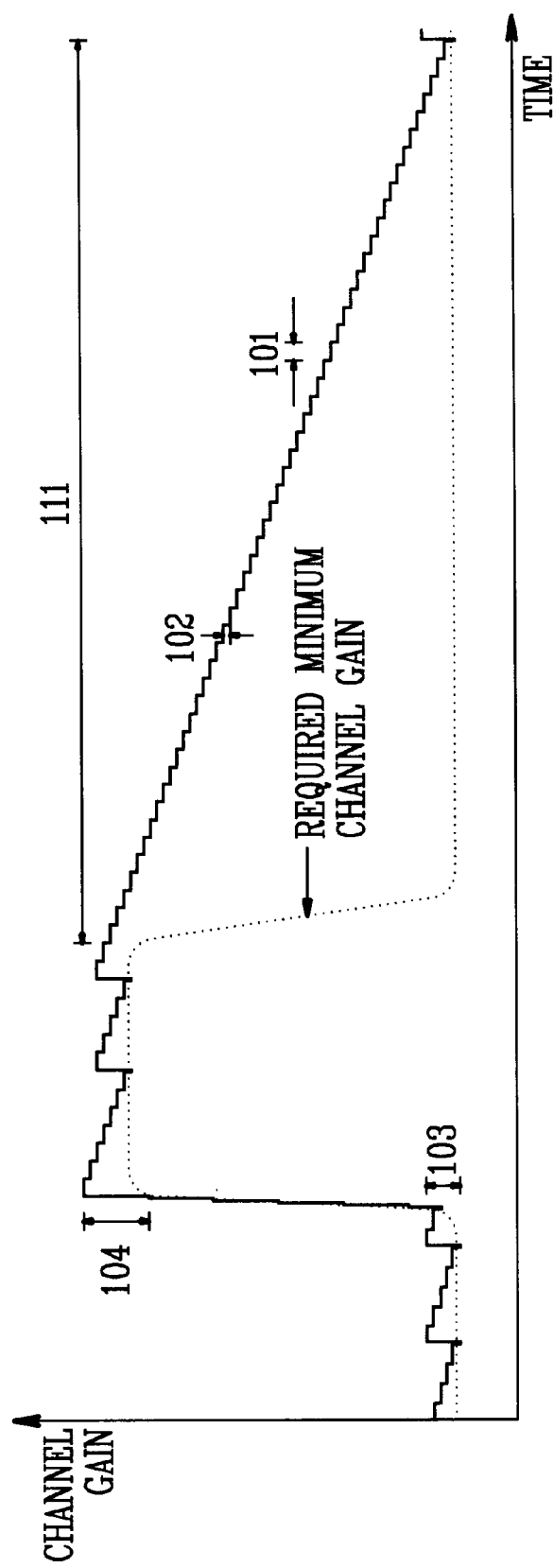
FIG. 1 is a graph showing the result of a forward link power control according to prior art in a case where a mobile station passes through the shadowing area.
Figure 3:
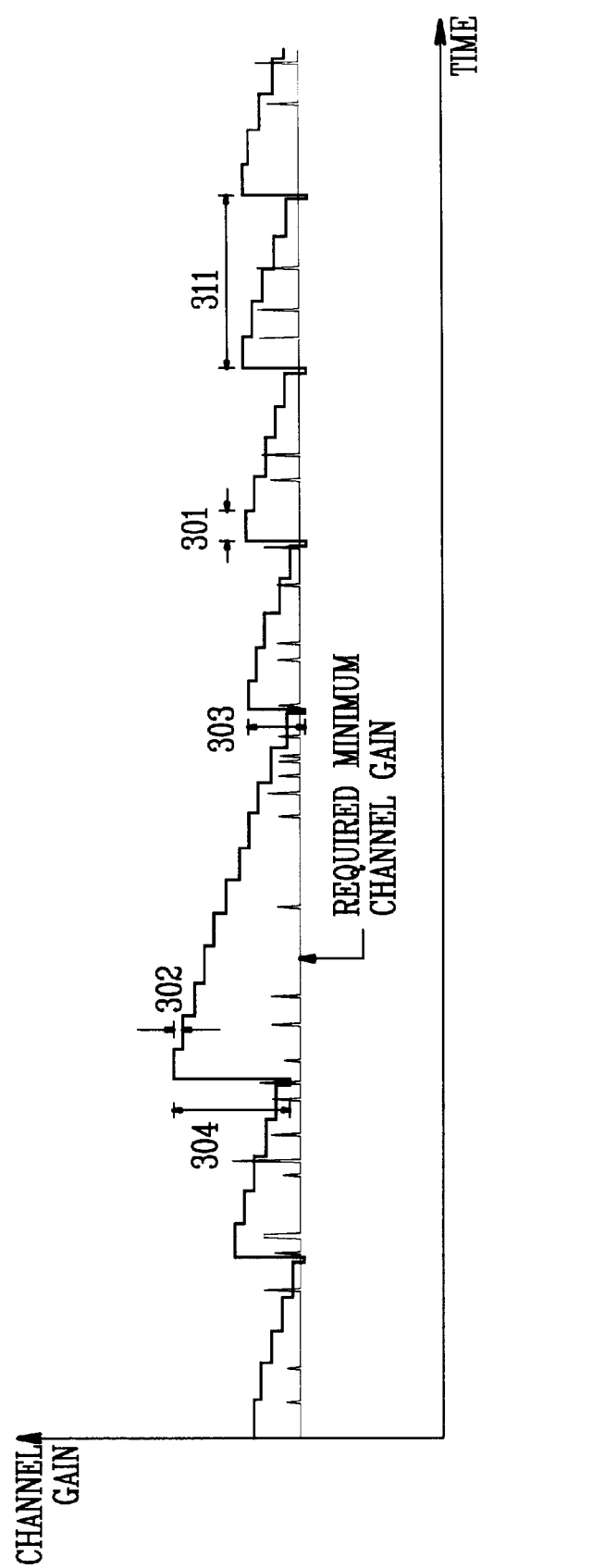
FIG. 3 is a graph showing the result of a forward link power control according to the prior art in a case where a mobile station is located at a position where there is little variations in the propagation environment.

In the preferred embodiment of the present invention as described above, the downward adjustment of channel gain is achieved in such a way that the gain down time can be varied automatically to be optimal to the current channel state. As understood from the result of comparison between down tracking times 111 and 211 in FIGS. 1 and 2, if the channel state becomes better suddenly, the power control is performed to decrease the gain down time gradually. Contrarily, a comparison between gain increase intervals 311 and 411 in FIGS. 3 and 4 shows us that when the power is approaching the optimal level, the gain down time is gradually increased to maintain low FER with power consumption equivalent to prior art.

It should be noted that such an effect can be achieved by varying gain down delta instead of gain down time, or both of them. That means, the present invention provides a downward adjustment of channel gain in such a manner that the extent of adjustment is variable adaptively based on the channel state.

The upward adjustment of channel gain in the embodiment of the present invention is achieved under conditions more precisely specified than in the prior art. First, in the upward adjustment of channel gain, a consideration is made whether the frame errors occuring in the previous channel state are continuous above corresponding threshold or discontinuous ones exceeding the corresponding threshold FER level. If there occur continuous and discontinuous error frames while the previous channel state is good, the channel gain is increased by a predetermined small delta to maintain the required FER, preventing unnecessary power consumption. With continuous errors while the previous channel state is not good, the channel gain is increased by a predetermined large delta to prevent deterioration of FER. With discontinuous errors, the channel gain is controlled to be incremented by a small delta. It is thus possible to approach the currently required power level more precisely based on each state of the previous channel and prevent unnecessary power consumption.

Such as in the present invention described above, the downward adjustment of channel gain is accomplished in such a way that the extent of adjustment is varied to the appropriate level automatically, while the upward adjustment of channel gain is executed in consideration of the previous channel state as well as FER reported from the mobile station, so that only necessary power in every channel states can be consumed and the power required to maintain FER is less than the power consumed in the prior art to maintain the equivalent FER. Consequently, the present invention makes it possible to reduce the interference affecting the mobile stations of the other cells as well as the other mobile stations in the related cell, which leads to an increase in the channel capacity of the entire system.

It will be apparent to those skilled in the art that various modifications and variations can be made in the method of performing power control according to the present invention without deviating from the spirit or scope of the invention. Thus, it is intended that the present invention cover the modifications and variations of this invention provided they come within the scope of the appended claims and their equivalents.

What is claimed is:

1. A method of performing power control in a mobile communication system, comprising:
   receiving a plurality of frames from a mobile terminal at prescribed regular intervals;
   receiving error rate information concerning the plurality of received frames from the mobile terminal;
   repeatedly updating information concerning a change of a channel state between a mobile station and a base station at the prescribed regular intervals;
   varying at least one of a channel gain up/down time and a channel gain up/down delta adaptively based on the error rate and the channel state; and
   adjusting the channel gain between the mobile station and the base station in at least one of an upward and downward adjustment.

2. The method as defined in claim 1, wherein the downward adjustment comprises:
   decreasing the gain down time continuously if the channel state is good; and
   increasing the gain down time continuously if the channel state is optimal.

3. The method as defined in claim 1, wherein a gain down timer is used in the step of repeatedly updating the information concerning the change of the channel state at regular intervals.

4. The method as defined in claim 3, wherein the gain down time is set to the previously decreased or increased gain down time when initializing the timer.

5. The method as defined in claim 1, wherein the downward adjustment of the channel gain comprises:
   judging whether or not the channel gain is smaller than the minimum channel gain; and
   if the channel gain is smaller than the minimum channel gain, setting the channel gain to the minimum channel gain.

6. The method as defined in claim 5, after the channel gain is set to the minimum channel gain, further comprising:
   judging whether the current power control state of the mobile station and the corresponding base station is a power control erase state or a power control good state; and
   decreasing or increasing the channel gain down time based on the result of the judgement.

7. The method as defined in claim 6, further comprising:
   if the current control state is the power control erase state, increasing the gain down time by a predetermined time up delta;
   comparing the gain down time with the maximum gain down time; and
   if the gain down time is greater than the maximum gain down time, setting the gain down time to the maximum gain down time.

8. The method as defined in claim 6, further comprising:
   if the current control state is the power control good state, decreasing the gain down time by a predetermined time down delta;
   comparing the gain down time with the minimum gain down time; and
   if the gain down time is smaller than the minimum gain down time, setting the gain down time to the minimum gain down time.

9. The method as defined in claim 6, wherein the gain down time is set to the minimum/maximum gain down time when it is decreased/increased.

10. The method as defined in claim 1, wherein the upward adjustment of the channel gain comprises:
    (a) if a continuous or discontinuous error frame occurs above a predetermined threshold in the condition that the previous channel state is good, increasing the channel gain by a first predetermined delta;
    (b) if a continuous error frame occurs above a predetermined threshold in the condition that the previous channel state is not good, increasing the channel gain by a second predetermined delta, the second predetermined delta being greater than the first predetermined delta by a predetermined value; and
    (c) if a discontinuous error frame occurs above a predetermined threshold irrespective of the previous channel state, increasing the channel gain by the first delta.

11. The method as defined in claim 10, wherein the step (a) comprises:
    judging whether the current power control state is the power control erase state or the power control good state; and if the current power control state is the power control good state, increasing the channel gain by a first predetermined gain up delta.

12. The method as defined in claim 11, further comprising:
prior to judgement as to the current power control state, judging whether or not a continuous erasure frame counter exceeds the first predetermined threshold; and
if the continuous erasure frame counter exceeds the first predetermined threshold, resetting the continuous erasure frame counter, a cumulative erasure frame counter and a continuous good frame counter.

13. The method as defined in claim 10, wherein the step (b) comprises:
judging whether the current power control state is the power control erase state or the power control good state; and
if the current power control state is the power control erase state, increasing the channel gain by a second gain up delta, the second gain up delta being greater than the first gain up delta by a predetermined value.

14. The method as defined in claim 10, wherein the step (c) comprises:
judging whether the current power control state is the power control erasure state or the power control good state; and
based on the result of the judgement, increasing the channel gain by a first gain up delta and changing the current power control state to the power control erase state.

15. The method as defined in claim 14, if the cumulative erasure frame counter exceeds the second threshold, further comprising the step of resetting the continuous erasure frame counter, the cumulative erasure frame counter and the modular frame counter.

16. The method as defined in claim 10, wherein the upward adjustment of the channel gain is performed when it is determined that an erasure indicator bit is extracted from an input transmission frame.

17. The method as defined in claim 16, if the erasure indicator bit is extracted, further comprising:
increasing the continuous erasure frame counter and the cumulative frame counter by one; and
resetting the continuous good frame counter.

18. The method as defined in claim 16, if the erasure indicator is not extracted, further comprising:
judging whether or not the continuous good frame counter has approached a third predetermined threshold; and
changing the power control state based on the result of the judgement.

19. The method as defined in claim 18, wherein the power control state is changed to the power control good state when the continuous good frame counter has approached the third threshold.

20. The method as defined in claim 19 further comprising:
judging whether the modular frame counter has approached the number of erasure measurement frames; and
if the modular frame counter has approached the number of the erasure measurement frames, resetting the cumulative erasure frame counter and modulo frame counter.

21. The method of claim 1, wherein the information concerning a change of a channel state comprises one of a power control good state and a power control erase state.

22. The method of claim 1, wherein a the error rate information comprises at least one of a power measurement report message and a one-bit erasure indicator bit, and wherein a selector of the base station receives the error rate information, increases or decreases the traffic channel gain based on the error rate information, and transmits the result to a channel element of the base station.

23. A method of performing power control in a mobile communication system, comprising:
receiving frames from a mobile terminal at prescribed regular intervals after a call between the mobile terminal and a base station has been established;
extracting an erasure indicator bit from the received frames;
increasing a modular frame counter by "1";
determining current and previous channel states for each of the prescribed regular intervals;
adaptively varying at least one of a channel gain up/down time and a channel gain up/down delta based on a current forward error rate and the previous channel state for each of the prescribed regular intervals; and
adjusting the channel gain between the mobile station and the base station in one of an upward or downward adjustment.

24. The method of claim 23, further comprising incrementing a continuous erasure frame counter and a cumulative erasure frame counter by one if the erasure indicator bit is 1, and resetting a continuous good frame counter to initialize a transition of the power control state.

25. The method of claim 24, further comprising resetting the continuous erasure frame counter, the cumulative erasure frame counter, and the modular frame counter if the continuous erasure frame counter exceeds a prescribed threshold.

26. The method of claim 25, further comprising one of (a) incrementing the channel gain by a small delta if the current power control state is the power control good state and converting the power control state to the power control erase state, and (b) increasing the channel gain by a big up delta if the current power control state is the power control erase state.

27. The method of claim 26, further comprising setting the channel gain to the maximum channel gain if the channel gain is greater than the maximum channel gain.

28. The method of claim 24, further comprising determining whether or not the cumulative erasure frame counter exceeds a corresponding threshold if the continuous erasure frame counter does not exceed the threshold.

29. The method of claim 28, further comprising resetting the continuous erasure frame counter, the cumulative erasure frame counter, and the modular frame counter if the cumulative erasure frame counter exceeds the threshold, and increasing the channel gain by a small delta and changing the state to the power control erase state.

30. The method of claim 23, further comprising resetting an erasure frame counter and increasing the continuous good frame counter by "1" if the erasure indicator bit is "0".

31. The method of claim 30, further comprising changing the power control state to the power control good state if the continuous good frame counter has reached a prescribed threshold.

32. The method of claim 31, further comprising resetting the modular frame counter and the cumulative erasure frame counter to initialize a process for discontinuous frame error if the modular frame counter has reached the erasure measurement frame value.

33. A method of performing power control in a mobile communication system, comprising:

receiving frames from a mobile terminal at prescribed regular intervals after a call between the mobile terminal and a base station has been established;

repeatedly updating information concerning the change of a channel state between the mobile station and the base station for each of the prescribed regular intervals;

determining a previous channel state for each of the prescribed regular intervals;

adaptively varying at least one of a channel gain up/down time and a channel gain up/down delta based on a current forward error rate and the previous channel state for each of the prescribed regular intervals; and adjusting the channel gain between the mobile station and the base station in one of an upward or downward adjustment.

34. The method of claim 33, further comprising extracting an erasure indicator bit from the received frames and increasing a modular frame counter by "1".

35. The method as defined in claim 33, further comprising setting the channel gain to the minimum channel gain if the channel gain is smaller than a minimum channel gain.

36. The method of claim 35, further comprising one of (a) decreasing the channel gain down time if the current power control state is a power control erase state, and (b) increasing the channel gain down time if the current power control state is a power control good state.

37. The method of claim 36, wherein if the current control state is the power control erase state, the method further comprises increasing the gain down time by a prescribed time up delta, comparing the gain down time with the maximum gain down time, and if the gain down time is greater than the maximum gain down time setting the gain down time to the maximum gain down time.

38. The method of claim 36, wherein if the current control state is the power control good state, the method further comprises decreasing the gain down time by a prescribed time down delta, comparing the gain down time with the minimum gain down time, and if the gain down time is smaller than the minimum gain down time, setting the gain down time to the minimum gain down time.

39. The method of claim 33, wherein the upward adjustment of the channel gain comprises:

(a) increasing the channel gain by a first prescribed gain up delta if the current power control state is the power control good state;

(b) increasing the channel gain by a second gain up delta, the second gain up delta being greater than the first gain up delta by a prescribed value if the current power control state is the power control erase state; and (c) increasing the channel gain by the first delta if a discontinuous error frame occurs above a prescribed threshold regardless of the previous channel state.

40. The method of claim 39, further comprising:

prior to judgement as to the current power control state, judging whether or not a continuous erasure frame counter exceeds the first prescribed threshold; and if the continuous erasure frame counter exceeds the first prescribed threshold, resetting the continuous erasure frame counter, a cumulative erasure frame counter and a continuous good frame counter.

* * * * *